(12) United States Patent
Huang

(10) Patent No.: US 12,024,443 B1
(45) Date of Patent: Jul. 2, 2024

(54) ION SEPARATION DEVICE FOR WATER BODY BASED ON WATER JET VORTEX

(71) Applicant: SWIRLOVA INC, Vernon, CA (US)

(72) Inventor: He Huang, Guangzhou (CN)

(73) Assignee: SWIRLOVA INC, Vernon, CA (US)

( * ) Notice: Subject to any disclaimer, the term of this patent is extended or adjusted under 35 U.S.C. 154(b) by 0 days.

(21) Appl. No.: 18/535,404

(22) Filed: Dec. 11, 2023

(30) Foreign Application Priority Data

Nov. 22, 2023 (CN) .......................... 202311567920.7

(51) Int. Cl.
*C02F 1/38* (2023.01)
*C02F 1/00* (2023.01)
*C02F 101/10* (2006.01)

(52) U.S. Cl.
CPC ............... *C02F 1/38* (2013.01); *C02F 1/006* (2013.01); *C02F 2101/10* (2013.01); *C02F 2201/005* (2013.01); *C02F 2301/026* (2013.01); *C02F 2301/066* (2013.01)

(58) Field of Classification Search
CPC ........ C02F 1/38; C02F 1/006; C02F 2101/10; C02F 2201/005; C02F 2301/026; C02F 2301/066

USPC ....................................................... 210/512.2
See application file for complete search history.

(56) References Cited

U.S. PATENT DOCUMENTS

2010/0187186 A1\* 7/2010 Howdeshell ....... B01D 17/0205
210/744

\* cited by examiner

*Primary Examiner* — Terry K Cecil
(74) *Attorney, Agent, or Firm* — WPAT, P.C

(57) ABSTRACT

An ion separation device for water body based on water jet vortex includes: a separation tank assembly including a tank and a water outlet pipe disposed in the tank, a collection separation plate and an impurity separation plate are disposed in the tank, and an inner space of the tank is divided into a collection region, a separation region, and an impurity region; and a first water delivery unit and a second water delivery unit. The first water delivery unit and the second water delivery unit are configured to generate high-pressure water flow and deliver the high-pressure water flow into the tank from two sides of the tank to generate a vortex in a water body and thus generate a centrifugal force, so as to make macromolecular impurities and metal ions in the water body be thrown away from a center of the tank.

7 Claims, 3 Drawing Sheets

ION SEPARATION DEVICE FOR WATER BODY BASED ON WATER JET VORTEX

TECHNICAL FIELD

The present disclosure relates to the technical field of purification treatment, particularly to an ion separation device for water body based on water jet vortex.

BACKGROUND

At present, working methods of common water purifiers in the market include a chemical coagulation precipitation method, a reverse osmosis (RO) membrane filtration method, and an ultrafiltration membrane treatment method. The chemical coagulation precipitation method is difficult to popularize because of the possibility of secondary pollution of water body. Although other kinds of membrane filtration water purifiers have higher water quality after filtration, there are also some practical problems that many kinds of filtration membranes are easy to block because of small pores thereof; the service life of components is short and needs to be replaced frequently; and filter membranes have failed, but it is not known by users thereof.

In order to prolong the service life of a filter membrane and prevent the filter membrane from quickly failing due to the blockage of the filter membrane by macromolecular impurities with a particle size larger than 1 nanometer and metal ions in water body, it is required to throw away the macromolecular impurities and metal ions in the water body before entering the filter membrane. However, pre-filters of the existing water purifiers do not have the ability to throw away the macromolecular impurities and metal ions.

SUMMARY

The present disclosure provides an ion separation device for water body based on water jet vortex, which aims to solve the problem that the pre-filters of the existing water purifiers do not have the ability to throw away the macromolecular impurities and metal ions.

An embodiment of the present disclosure provides an ion separation device for water body based on water jet vortex, which includes:
- a separation tank assembly, including a tank and a water outlet pipe disposed in the tank, a collection separation plate and an impurity separation plate are disposed in the tank, and an inner space of the tank is divided into a collection region, a separation region, and an impurity region by the impurity separation plate and the collection separation plate; and
- a first water delivery unit and a second water delivery unit, the first water delivery unit and the second water delivery unit are each connected to the tank;
- the first water delivery unit and the second water delivery unit are configured to generate high-pressure water flow and deliver the high-pressure water flow into the tank from two sides of the tank to generate a vortex in a water body in the tank and thus generate a centrifugal force, so as to make macromolecular impurities and metal ions in the water body be thrown away from a center of the tank, make the macromolecular impurities and the metal ions pass through the impurity separation plate along an inner wall of the tank to reach the impurity region, make the water body in the separation region leave the tank from the water outlet pipe for a subsequent advanced purification process.

In an embodiment, the first water delivery unit includes a water inlet pipe assembly, an electromagnetic valve, a hydraulic ram pump, a quantum low-frequency device, and an energy storage device; and the water inlet pipe assembly, the electromagnetic valve, the hydraulic ram pump, the quantum low-frequency device, and the energy storage device of the first water delivery unit are sequentially connected in that order through pipelines; and the second water delivery unit includes a water inlet pipe assembly, an electromagnetic valve, a hydraulic ram pump, a quantum low-frequency device, and an energy storage device; and the water inlet pipe assembly, the electromagnetic valve, the hydraulic ram pump, the quantum low-frequency device, and the energy storage device of the second water delivery unit are sequentially connected in that order through pipelines.

In an embodiment, the water inlet pipe assembly of the first water delivery unit is configured for connecting a tap water pipe and delivering tap water from the tap water pipe to the electromagnetic valve of the first water delivery unit, and the high-pressure water flow is generated through the electromagnetic valve of the first water delivery unit and is delivered to the hydraulic ram pump of the first water delivery unit, then to the quantum low-frequency device of the first water delivery unit, and finally to the energy storage device of the first water delivery unit; the water inlet pipe assembly of the second water delivery unit is configured for connecting a tap water pipe and delivering tap water from the tap water pipe to the electromagnetic valve of the second water delivery unit, and the high-pressure water flow is generated through the electromagnetic valve of the second water delivery unit and is delivered to the hydraulic ram pump of the second water delivery unit, then to the quantum low-frequency device of the second water delivery unit, and finally to the energy storage device of the second water delivery unit.

In an embodiment, the first water delivery unit and the second water delivery unit have the same structure, and are symmetrically disposed at the two sides of the separation tank assembly.

In an embodiment, the tank is provided with a first water inlet pipe and a second water inlet pipe thereon, the first water inlet pipe is connected with the energy storage device of the first water delivery unit, and the second water inlet pipe is connected with the energy storage device of the second water delivery unit.

In an embodiment, a circular hole is disposed in a middle of the impurity separation plate, one or more layers of stainless steel meshes are disposed in the circular hole, and each of the one or more layers of stainless steel meshes is provided with coconut shell activated carbon thereon. A stainless steel mesh is disposed in the water outlet pipe. The coconut shell activated carbon is disposed between the separation region and the impurity region, and the impurities in the water body are adsorbed by the coconut shell activated carbon to achieve the functions of adsorbing different colors and odors of the water body, improving taste of the water body, and purifying of the water body. The stainless steel mesh disposed in the water outlet pipe is used to prevent the coconut shell activated carbon from escaping to the outside of the tank.

Compared with the related art, the embodiments of the present disclosure mainly has the following beneficial effects.

1. The ion separation device for water body based on water jet vortex provided by the disclosure injects high-pressure water flow into a tank through a second water delivery unit and a first water delivery unit, so that a water body in the tank generates a vortex; after the water body generates the vortex, a huge centrifugal force is generated to throw macromolecular impurities and metal ions in the water body away from a center of the tank, so as to complete the separation of the macromolecular impurities and the metal ions in the water body and obtain a purified water body composed of small water cluster.

2. In the ion separation device for water body based on water jet vortex provided by the disclosure, the coconut shell activated carbon is disposed on the impurity separation plate, and a stainless steel mesh is disposed in a water outlet pipe, coconut shell activated carbon is disposed between a separation region and a impurity region, such that the impurities in the water body are adsorbed by the coconut shell activated carbon to achieve the functions of adsorbing different colors and odors of the water body, improving taste of the water body, and purifying of the water body.

DETAILED DESCRIPTION OF EMBODIMENTS

Unless otherwise defined, all technical and scientific terms used herein have the same meaning as commonly understood by those skilled in the art of the present disclosure. The terminologies used in the specification of the present disclosure herein are merely for describing specific embodiments and are not intended to limit the present disclosure. The terms "including" and "having" in the specification and claims of the present disclosure and the above brief description of drawings, as well as any variations thereof, are intended to cover non-exclusive inclusion. The terms "first" and "second" in the specification and claims of the present disclosure and the above brief description of drawings are used to distinguish different objects, but not to describe a specific order.

Reference to "an embodiment" herein means that a particular feature, structure or characteristic described in connection with the embodiment can be included in at least one embodiment of the present disclosure. The appearance of this phrase in various places in the specification does not necessarily refer to the same embodiment, nor an independent or alternative embodiment mutually exclusive with other embodiments. It is understood explicitly and implicitly by those skilled in the art that the embodiments described herein can be combined with other embodiments.

Figure 1:
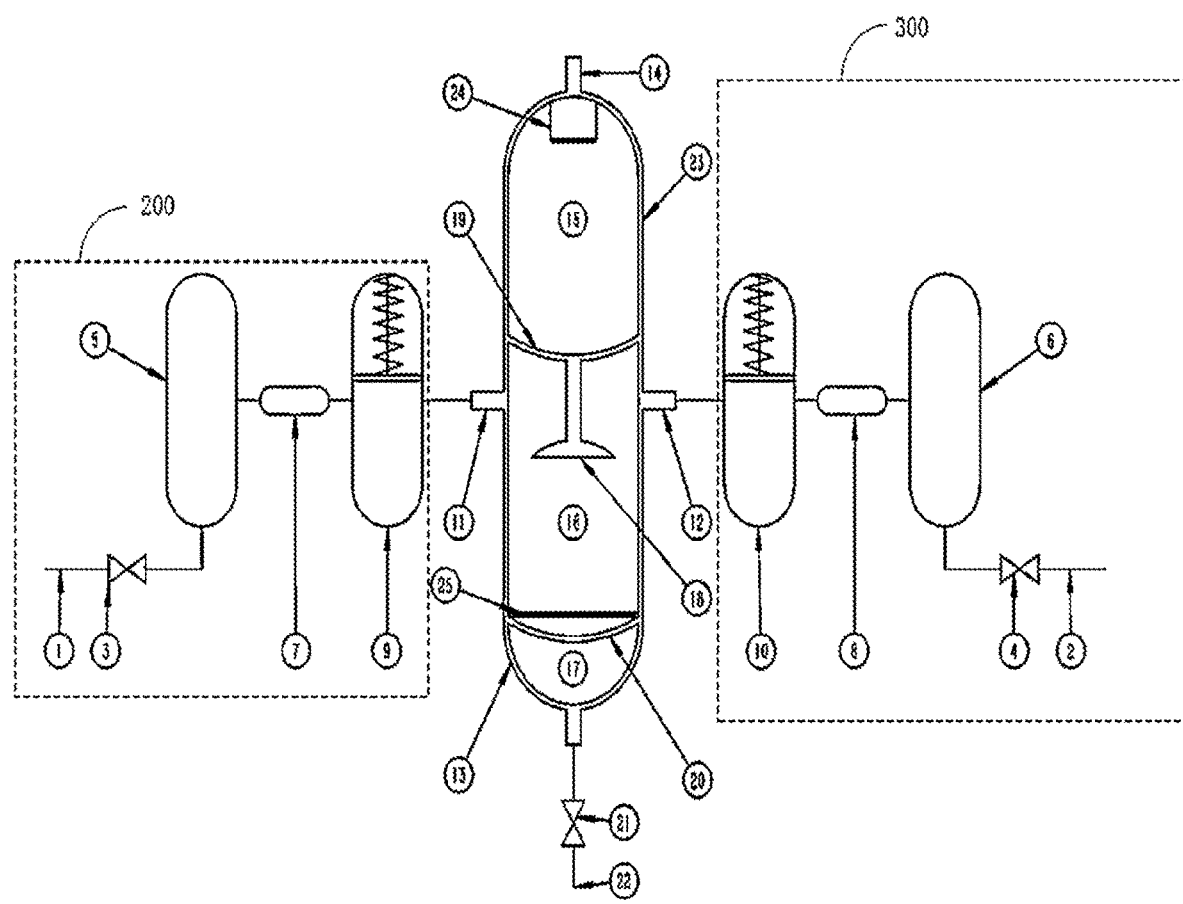
FIG. 1 illustrates a schematic structural view of an ion separation device for water body based on water jet vortex according to an embodiment of the present disclosure.
Figure 2:
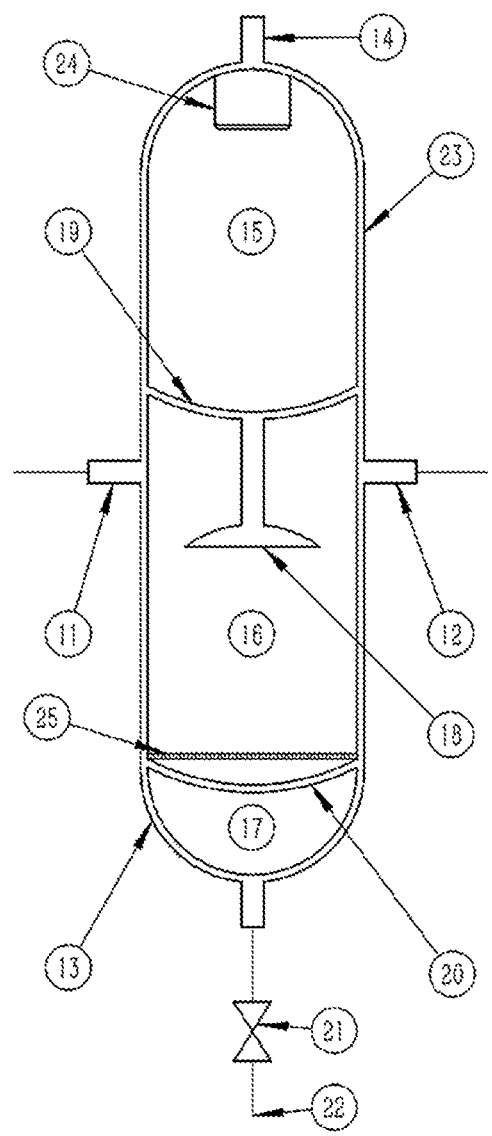
FIG. 2 illustrates a schematic view of an internal structure of a separation tank assembly of an ion separation device for water body based on water jet vortex.

An embodiment of the present disclosure provides an ion separation device for water body based on water jet vortex, as shown in FIGS. 1 and 2, which includes a separation tank assembly 23, a first water delivery unit 200, and a second water delivery unit 300.

The separation tank assembly 23 includes a tank 13 and a water outlet pipe 14 disposed in the tank 13. A collection separation plate 19 and an impurity separation plate 20 are disposed in the tank 13, and an inner space of the tank 13 is divided into a collection region 15, a separation region 16, and an impurity region 17 by the impurity separation plate 20 and the collection separation plate 19.

The first water delivery unit 200 and the second water delivery unit 300 are each connected to the tank 13.

The first water delivery unit 200 includes a water inlet pipe assembly 1, an electromagnetic valve 3, a hydraulic ram pump 5, a quantum low-frequency device 7, and an energy storage device 9. The water inlet pipe assembly 1, the electromagnetic valve 3, the hydraulic ram pump 5, the quantum low-frequency device 7, and the energy storage device 9 of the first water delivery unit 200 are sequentially connected in that order through pipelines. The water inlet pipe assembly 1 is configured for connecting a tap water pipe and delivering tap water to the electromagnetic valve 3. A high-pressure water flow is generated by the electromagnetic valve 3 and is delivered to the hydraulic ram pump 5, then to the quantum low-frequency device 7, and finally to the energy storage device 9. The energy storage device 9 is configured to press the high-pressure water flow into the separation tank assembly 23 through a first water inlet pipe 11 on the tank 13. The second water delivery unit 300 includes a water inlet pipe assembly 2, an electromagnetic valve 4, a hydraulic ram pump 6, a quantum low-frequency device 8, and an energy storage device 10. The water inlet pipe assembly 2, the electromagnetic valve 4, the hydraulic ram pump 6, the quantum low-frequency device 8, and the energy storage device 10 of the second water delivery unit 300 are sequentially connected in that order through pipelines. The water inlet pipe assembly 2 is configured for connecting a tap water pipe and delivering tap water to the electromagnetic valve 4. A high-pressure water flow is generated by the electromagnetic valve 4 and is delivered to the hydraulic ram pump 6, then to the quantum low-frequency device 8, and finally to the energy storage device 10. The energy storage device 10 is configured to press the high-pressure water flow into the separation tank assembly 23 through a second water inlet pipe 12 on the tank 13. In an embodiment, the first water delivery unit 200 and the second water delivery unit 300 have the same structure, that is to say, the water inlet pipe assemblies 1 and 2 are the same in structure, the electromagnetic valves 3 and 4 are the same in structure, the hydraulic ram pumps 5 and 6 are the same in structure, the quantum low-frequency devices 7 and 8 are the same in structure, and the energy storage devices 9 and 10 are the same in structure. The first water delivery unit 200 and the second water delivery unit 300 are symmetrically disposed at two sides of the separation tank assembly 23. Specific structures of the water inlet pipe assemblies 1 and 2, the electromagnetic valves 3 and 4, the hydraulic ram pumps 5 and 6, the quantum low-frequency devices 7 and 8, and the energy storage devices 9 and 10 are well known by the skilled in the art, which are not repeated herein.

In this embodiment, the first or second water delivery unit 200/300 uses the hydraulic ram pump 5/6 to generate the high-pressure water flow, and the high-pressure water flow is delivered to the energy storage device 9/10 after activating treatment of the high-pressure water flow by the quantum low-frequency device 7/8. A structural principle of the energy storage device 9/10 is similar to that of a pressure storage tank, which mainly stores the high-pressure water flow of the hydraulic ram pump 5/6, and then is collectively released into the tank 13 by the energy storage device 9/10. As such, each of the second water delivery unit 300 and the first water delivery unit 200 injects the high-pressure water flow into the tank 13 to make a water body from each of the first water delivery unit 200 and the second water delivery unit 300 in the tank 13 generate a vortex through a vortex component 18 connected to the collection separation plate 19 in the tank 13. After the water body generates the vortex, a huge centrifugal force is generated and throws macromolecular impurities and metal ions in the water body away from a center of the tank 13, and the macromolecular impurities and the metal ions slide down an inner wall of the tank 13 into a groove of the impurity separation plate 20, and are gradually pushed into the impurity region 17 under the action of a water pressure. Purified water in a middle of the tank 13 (i.e., in the separation region 16) enters the collection region 15 along the collection separation plate 19 and enters a next purification step.

The collection region 15 is connected with (i.e., in communication with) the outside through the water outlet pipe 14 disposed at a top of the tank 13, and a water pump is disposed at the water outlet pipe 14 at the top of the tank 13, so that the purified water in the collection region 15 is pumped out by the water pump and thus a negative pressure is formed, which is convenient for the water outlet pipe 14 to absorb the water in the separation region 16 into the collection region 15. An end of the outlet pipe 14 is provided with a collection cover, which is convenient for forming a negative pressure region and accelerating the rising of water flow;

The quantum low-frequency device 7/8 is configured to create an energy bin according to the principles of quantum resonance and quantum entanglement. When water cluster pass through the energy bin, the water cluster cut magnetic lines and an arrangement structure of the water cluster changes, and the water cluster are adjusted from a Brownian motion with irregular high frequency to a regular low frequency motion, thereby breaking bond viscosity of water cluster to thus adjust the frequency of water. Low-frequency small water cluster has strong activity and penetration, and can effectively penetrate a cell membrane and be quickly absorbed by cells.

The main application scene of the present disclosure is the purpose of water purification in a catering industry. The device of the present disclosure can pretreat a water body at a front end of a traditional large-scale purification apparatus, so as to reduce the pressure of subsequent purification, reduce a throughput of macromolecular impurities and metal ions in the water body on a filtration membrane, and effectively prolong the service life of the filtration membrane. In the present disclosure, separation and filtration are mainly realized by a physical manner, and the consumption of the device is low.

In an embodiment, the tank 13 is provided with a first water inlet pipe, e g., left water inlet pipe 11 and a second water inlet pipe, e g. right water inlet pipe 12, which are respectively connected with (i.e., in communication with) the first water delivery unit 200 and the second water delivery unit 300. The left water inlet pipe 11 and the right water inlet pipe 12 are respectively disposed along tangential directions of the tank 13. When the first water delivery unit 200 and the second water delivery unit 300 inject the high-pressure water flow into the tank 13, the arrangement of the left water inlet pipe 11 and the right water inlet pipe 12 along the tangential directions will speed up the vortex generated by the high-pressure water flow.

In an embodiment, the water inlet pipe assembly 1 or 2 includes a water inlet pipe and an electromagnetic valve connected in series with the water inlet pipe. The water inlet pipe of the water inlet pipe assembly 1 or 2 is also provided with a pressure relief valve facing away from a water inlet end. Water stored in the electromagnetic valve 3 or 4 can be discharged by opening the pressure relief valve after the electromagnetic valve is closed.

In an embodiment, the impurity separation plate 20 has a disk structure, a circular hole is provided in a middle of the disk structure, and one or more layers of stainless steel meshes 25 are disposed in the circular hole. An upper part of each of the one or more layers of stainless steel meshes 25 is filled with coconut shell activated carbon or other purification materials to achieve the functions of absorbing different colors and odors of the water body, improving the taste of the water body, and purifying of the water body. A bottom of the tank 13 is provided with a drainage assembly 22. The drainage assembly 22 connected with (i.e., in communication with) the impurity region 17 through a valve 21. The drainage assembly 22 includes a drainage pipe. The valve 21 is configured to control the impurity region 17 to release the impurity to the outside.

In an embodiment, a stainless steel mesh is disposed at an end of the water outlet pipe 14, and the purpose of this stainless steel mesh is to isolate the coconut shell activated carbon on the impurity separation plate 20 from leaving the separation tank assembly 23 through the water outlet pipe 14. The water outlet pipe 14 is configured for connecting to a post-stage deep purification device through a pipeline.

Figure 3:
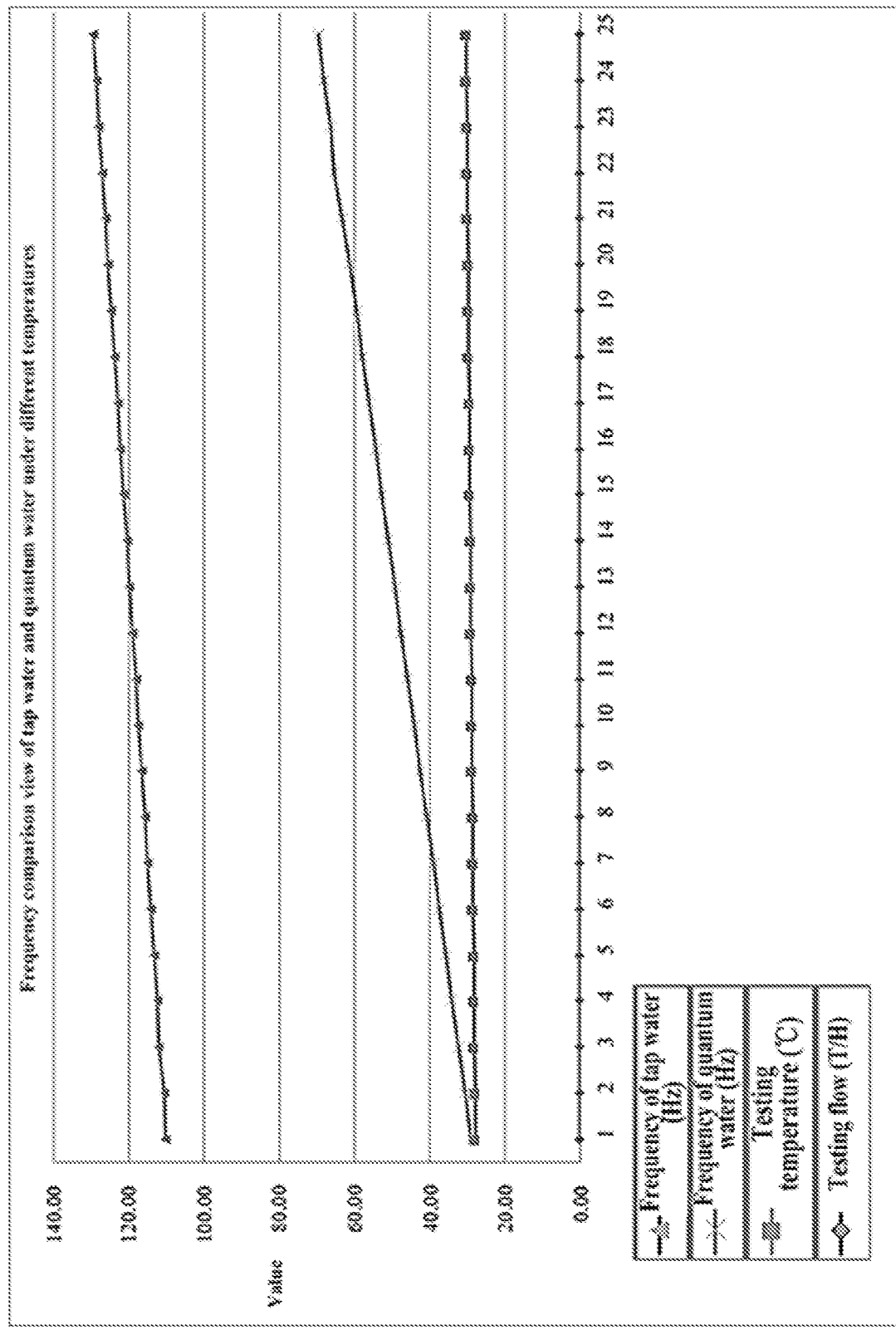
FIG. 3 illustrates an analysis view of experimental data of a nuclear magnetic resonance method for an ion separation device for water body based on water jet vortex.

In the present disclosure, a half-width of a vibration rate of water (a size of a water cluster is expressed in Hertz (Hz)). The larger the Hz value is, the greater the water cluster is, and the worse the water quality is. The smaller the Hz value is, the smaller the water cluster is, and the better the quality of water is. A size of a water cluster of quantum water obtained after 30 minutes of treatment by the device of the present disclosure is tested according to a nuclear magnetic resonance method, and is compared with untreated tap water simultaneously. As shown in FIG. 3 and table 1 below, an Hz value of the quantum water of the present disclosure is only ⅓ of that of the untreated tap water. That is to say, after being treated by the device of the present disclosure, the water cluster of the quantum water is smaller and the water quality is better.

It should be noted that for the purpose of simple description, all the aforementioned embodiments are expressed as a series of action combinations, but those skilled in the art should know that the present disclosure is not limited by the order of the described actions, because some steps may be performed in other sequences or at the same time according to the present disclosure. In addition, those skilled in the art should also know that the embodiments described in the specification are all preferred embodiments, and the actions and modules involved are not necessarily necessary for the present disclosure.

TABLE 1

Experimental data of a nuclear magnetic resonance method temperature

| Testing flow (T/H) | Testing temperature (° C.) | Frequency of tap water (Hz) | Frequency of quantum water (Hz) |
| --- | --- | --- | --- |
| 0.25 | 27.9 | 110.2 | 29 |
| 0.25 | 28 | 110.5 | 30.7 |
| 0.25 | 28.1 | 112.0 | 32.4 |
| 0.25 | 28.2 | 112.4 | 34.1 |
| 0.25 | 28.3 | 113.3 | 35.8 |
| 0.25 | 28.4 | 114.1 | 37.5 |
| 0.25 | 28.5 | 114.9 | 39.2 |
| 0.25 | 28.6 | 115.7 | 40.9 |
| 0.25 | 28.7 | 116.5 | 42.6 |

TABLE 1-continued

Experimental data of a nuclear magnetic resonance method temperature

| Testing flow (T/H) | Testing temperature (° C.) | Frequency of tap water (Hz) | Frequency of quantum water (Hz) |
|---|---|---|---|
| 0.25 | 28.8 | 117.4 | 44.3 |
| 0.25 | 28.9 | 118.2 | 46 |
| 0.25 | 29 | 119.0 | 47.7 |
| 0.25 | 29.1 | 119.8 | 49.4 |
| 0.25 | 29.2 | 120.6 | 51.1 |
| 0.25 | 29.3 | 121.4 | 52.8 |
| 0.25 | 29.4 | 122.2 | 54.5 |
| 0.25 | 29.5 | 123.0 | 56.2 |
| 0.25 | 29.6 | 123.8 | 57.9 |
| 0.25 | 29.7 | 124.6 | 59.6 |
| 0.25 | 29.8 | 125.5 | 61.3 |
| 0.25 | 29.9 | 126.3 | 63.5 |
| 0.25 | 30 | 127.1 | 65.4 |
| 0.25 | 30.1 | 127.9 | 66.3 |
| 0.25 | 30.2 | 128.7 | 68.2 |
| 0.25 | 30.3 | 129.5 | 69.7 |

The above embodiments are merely used to illustrate the technical solutions of the present disclosure, and do not limit the scope of protection of the present disclosure. Apparently, the described embodiments are only parts of embodiments of the present disclosure, not the whole embodiments. Based on these described embodiments, all other embodiments obtained by ordinary technicians in the field without creative work belong to the scope of protection of the present disclosure. Although the present disclosure has been described in detail with reference to the above-mentioned embodiments, the ordinary technicians in the field can still combine the features in various embodiments of the present disclosure, add features, delete the features in various embodiments of the present disclosure, or make other adjustments to the features in various embodiments of the present disclosure according to the situation without any conflict, so as to obtain other different technical solutions whose essence does not deviate from the concept of the present disclosure, and these technical solutions also belong to the scope of protection of the present disclosure.

What is claimed is:

1. An ion separation device for water body based on water jet vortex, comprising:
    a separation tank assembly (23), comprising a tank (13) and a water outlet pipe (14) disposed in the tank (13), wherein a collection separation plate (19) and an impurity separation plate (20) are disposed in the tank (13), and an inner space of the tank (13) is divided into a collection region (15), a separation region (16), and an impurity region (17) by the impurity separation plate (20) and the collection separation plate (19); and
    a first water delivery unit (200) and a second water delivery unit (300), wherein the first water delivery unit (200) and the second water delivery unit (300) are each connected to the tank (13);
    wherein the first water delivery unit (200) and the second water delivery unit (300) are configured to generate water flow and deliver the water flow into the tank (13) from two sides of the tank (13) to generate a vortex in a water body in the tank (13) and thus generate a centrifugal force, so as to make macromolecular impurities and metal ions in the water body be thrown away from a center of the tank (13), make the macromolecular impurities and the metal ions pass through the impurity separation plate (20) along an inner wall of the tank (13) to reach the impurity region (17), make the water body in the separation region (16) leave the tank (13) from the water outlet pipe (14) for a subsequent advanced purification process;
    wherein the first water delivery unit (200) comprises a water inlet pipe assembly (1), an electromagnetic valve (3), a hydraulic ram pump (5), a quantum low-frequency device (7), and an energy storage device (9); and the water inlet pipe assembly (1), the electromagnetic valve (3), the hydraulic ram pump (5), the quantum low-frequency device (7), and the energy storage device (9) of the first water delivery unit (200) are sequentially connected in that order through pipelines; and
    wherein the second water delivery unit (300) comprises a water inlet pipe assembly (2), an electromagnetic valve (4), a hydraulic ram pump (6), a quantum low-frequency device (8), and an energy storage device (10); and the water inlet pipe assembly (2), the electromagnetic valve (4), the hydraulic ram pump (6), the quantum low-frequency device (8), and the energy storage device (10) of the second water delivery unit (300) are sequentially connected in that order through pipelines.

2. The ion separation device for water body based on water jet vortex as claimed in claim 1, wherein the water inlet pipe assembly (1) of the first water delivery unit (200) is configured for connecting a tap water pipe and delivering tap water from the tap water pipe to the electromagnetic valve (3) of the first water delivery unit (200), and the water flow is generated through the electromagnetic valve (3) of the first water delivery unit (200) and is delivered to the hydraulic ram pump (5) of the first water delivery unit (200), then to the quantum low-frequency device (7) of the first water delivery unit (200), and finally to the energy storage device (9) of the first water delivery unit (200);
    wherein the water inlet pipe assembly (2) of the second water delivery unit (300) is configured for connecting a tap water pipe and delivering tap water from the tap water pipe to the electromagnetic valve (4) of the second water delivery unit (300), and the water flow is generated through the electromagnetic valve (4) of the second water delivery unit (300) and is delivered to the hydraulic ram pump (6) of the second water delivery unit (300), then to the quantum low-frequency device (8) of the second water delivery unit (300), and finally to the energy storage device (10) of the second water delivery unit (300).

3. The ion separation device for water body based on water jet vortex as claimed in claim 2, wherein the first water delivery unit (200) and the second water delivery unit (300) have the same structure, and are symmetrically disposed at the two sides of the separation tank assembly (23).

4. The ion separation device for water body based on water jet vortex as claimed in claim 3, wherein the tank (13) is provided with a first water inlet pipe (11) and a second water inlet pipe (12) thereon, the first water inlet pipe (11) is connected with the energy storage device (9) of the first water delivery unit (200), and the second water inlet pipe (12) is connected with the energy storage device (10) of the second water delivery unit (300).

5. The ion separation device for water body based on water jet vortex as claimed in claim 4, wherein the first water inlet pipe (11) and the second water inlet pipe (12) are respectively disposed at two opposite sides of the tank (13).

6. The ion separation device for water body based on water jet vortex as claimed in claim 5, wherein a circular hole is disposed in a middle of the impurity separation plate (20), one or more layers of stainless steel meshes are disposed in the circular hole, and each of the one or more layers of stainless steel meshes is provided with coconut shell activated carbon thereon.

7. The ion separation device for water body based on water jet vortex as claimed in claim 6, wherein a stainless steel mesh (24) is disposed in the water outlet pipe (14).

\* \* \* \* \*